(12) United States Patent
Fell et al.

(10) Patent No.: US 6,191,521 B1
(45) Date of Patent: Feb. 20, 2001

(54) VIBRATION DAMPER ASSEMBLY FOR A VIBRATING STRUCTURE GYROSCOPE RESONATOR

(75) Inventors: Christopher Paul Fell; Ian David Hopkin; Timothy Robert Mason; Kevin Townsend, all of Plymouth (GB)

(73) Assignee: BAE Systems PLC, Hants (GB)

( * ) Notice: Under 35 U.S.C. 154(b), the term of this patent shall be extended for 0 days.

(21) Appl. No.: 09/417,304

(22) Filed: Oct. 13, 1999

(30) Foreign Application Priority Data

Jun. 12, 1997 (GB) .................................................. 9712104

(51) Int. Cl.[7] ................. H01L 310/367; H01L 310/388; H01L 310/326
(52) U.S. Cl. ............................... 310/326; 310/328; 74/5.5
(58) Field of Search ....................................... 310/326, 328, 310/313 B, 313 R, 348; 74/5.5

(56) References Cited

U.S. PATENT DOCUMENTS 5,256,929   10/1993   Terajima .............................. 310/326

*Primary Examiner*—Thomas M. Dougherty
*Assistant Examiner*—Karen Addison
(74) *Attorney, Agent, or Firm*—Kenyon & Kenyon

(57) ABSTRACT

A vibration damper assembly for a ring resonator of a vibrating structure gyroscope has a female portion attachable to a body of the gyroscope so as to have limited resiliency with respect to the body in a direction substantially perpendicular to the body. A male portion is fixedly attachable at one end to a resonator of the gyroscope, projectable into the female portion and fixedly attachable at its other end in and to the female portion. The assembly permits damping of vibratory movement of the resonator in a direction substantially perpendicular thereto whilst retaining stiffness and freedom to vibrate for the resonator in the plane thereof.

18 Claims, 5 Drawing Sheets

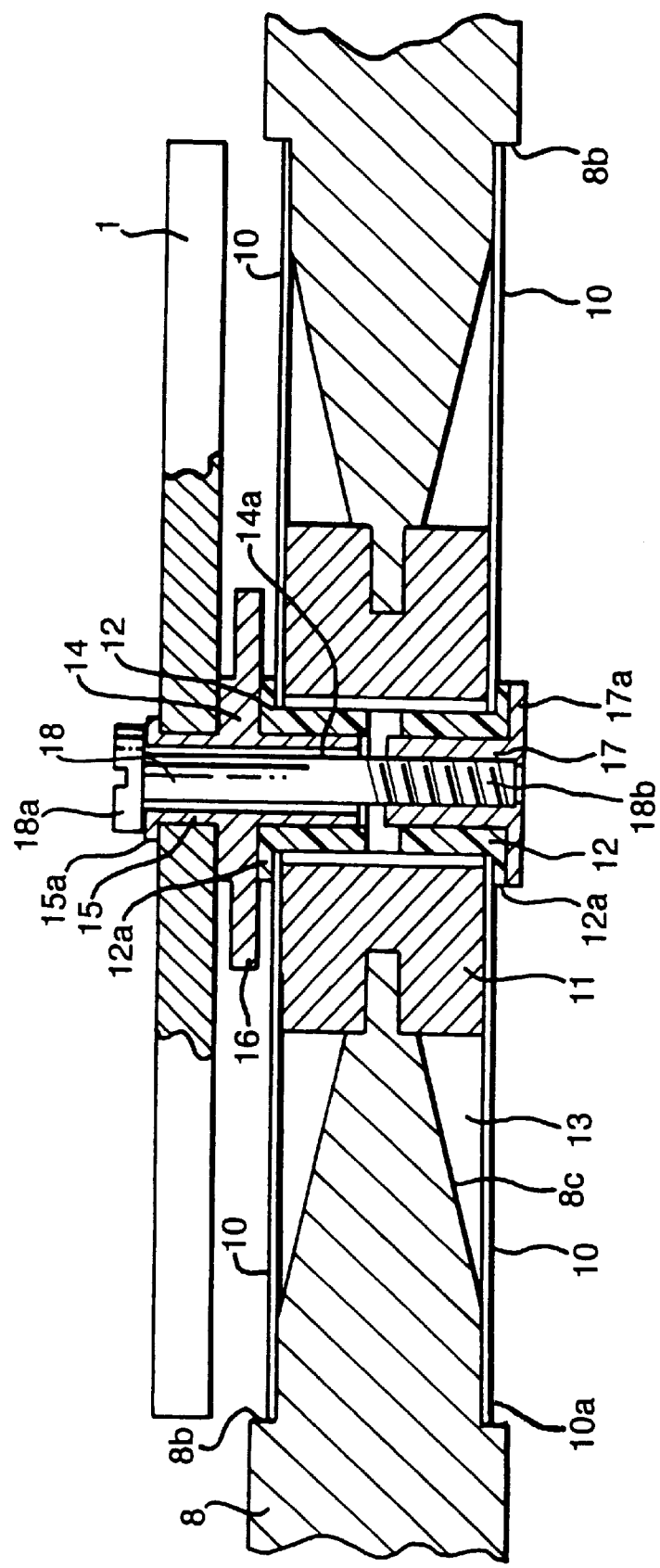

VIBRATION DAMPER ASSEMBLY FOR A VIBRATING STRUCTURE GYROSCOPE RESONATOR

BACKGROUND OF THE INVENTION

This invention relates to a vibration damper assembly for a Vibrating Structure Gyroscope Resonator suitable particularly, but not exclusively, for use with a substantially ring-like, substantially planar resonator.

It is known to build Vibrating Structure Gyroscopes using planar ring members as the resonant structure. The principles of operation and practical implementation of ring structures in vibrating structure gyroscopes are described in the present Applicants EP/UK-B-0461761.

The ring is typically excited into a cos $2\theta$ resonance mode. This mode actually exists as a degenerate pair of modes at a mutual angle of 45°. The vibration patterns for these modes are shown schematically in FIG. 1A and 1B. One of the modes is excited as the carrier mode as shown in FIG. 1A with the other used as the response mode as shown in FIG. 1B. The carrier mode vibration is typically maintained at a constant amplitude at the peak resonance frequency. When the gyro body is rotated, Coriolis forces couple energy into the response mode. The amplitude of motion of the response mode is directly proportional to the applied rotation rate.

A particular implementation of this technology uses a Nickel-Iron alloy (Nilo-45) planar metal ring as the resonator 1 as shown in FIG. 2. The outer diameter of the ring 1 is 22 mm with a rim width of 1 mm and a depth of 1.2 mm. The ring is attached to a central hub 2 by means of eight compliant legs 3 allowing substantially undamped motion of the ring 1. The ring is attached to a support pedestal (not shown) at the central hub 2 to leave the ring 1 and legs 3 freely suspended. The ring structure, together with location of the carrier mode drive elements 4 (to set the ring into oscillation) and pick-off elements (to detect the motion) around the ring are shown schematically in FIG. 2. The carrier mode drives 4 excite the carrier mode resonance at two anti-nodal positions (i.e. points of maximum radial motion). The carrier mode pick-offs 5 detect this motion at the remaining anti-nodal points. The response mode pick-offs 6 are located at two of the response mode anti-nodal positions. The signal level on these pick-offs will be directly proportional to the applied rate.

Many potential sensor applications require the gyroscope to operate under quite demanding environmental conditions. One such requirement is that the rate output noise should remain within specified limits in response to an applied vibration spectrum. The applied vibration spectrum for a typical automotive application is 10–800 Hz at 2 g rms. However, certain military applications specify significantly higher vibration levels over wider spectral ranges.

The principle effect of an applied vibration will be to cause motion of the resonator with respect to the gyro body. As the pick-off modules are rigidly attached to the gyro body this will inevitably cause a corresponding relative motion between the resonator and pick-offs. The sensor pick-offs 5, 6 are of capacitive design with the pick-off plate and the circumferential edge of the ring 1 forming the two capacitor plates. The ring 1 is maintained at high voltage with respect to the pick-off plates. Any change in the pick-off to ring gap will give rise to a signal. Applied vibration in the plane of the ring 1 will modulate the capacitor plate gap at the input vibration frequency. The pick-offs 5, 6 are arranged in pairs with the signals from pick-offs positioned diametrically opposite one another across the ring being summed at the input to the signal processing electronics. These signals will be in anti-phase and will thus tend to cancel one another provided that the pick-off gains are well matched.

Vibration along the axis normal to the plane of the ring 1 will cause the rim to move with respect to the pick-off plate 5, 6, as shown in cross-section in FIG. 3. The net effect of this motion is also to modulate the pick-off to ring gap. the phase of the signals on the pick-off pair will be identical for this motion of the ring and will therefore sum together. Furthermore, if the pick-off plate and ring are not aligned precisely parallel this will also cause the gap size to change generating a vibration induced error signal.

Any relative motion of the resonator 1 with respect to the pick-offs 5, 6 will generate a signal on the pick-offs. The scheme for the derivation of the rate signal in the sensor means that only noise inputs around the ring resonance frequency, within the gyroscope bandwidth, pass through to the rate output. This is shown schematically in FIGS. 4A to 4F. The ring is vibrated at the cos $2\theta$ resonance frequency which provides the carrier signal at which demodulation takes place (FIG. 4A). A rate input (FIG. 4B) modulates the carrier giving sidebands on the pick-off signal output as shown in FIG. 4C. The vibration induced noise will appear at the baseband frequency. In the absence of any filtering the gyroscope output will appear as in FIG. 4D. This is filtered by the effective system bandwidth (FIG. 4E) to give the observed rate output shown in FIG. 4F.

For the known gyroscope described here the carrier frequency is at 5 kHz. This is well above any applied vibration input band and thus the gyroscope is inherently insensitive to vibration under normal circumstances. However, at extreme levels of vibration the amplitude of the ring motion may become sufficiently large to saturate the pick-off amplifier output at particular times in the vibration cycle. This intermittent saturation will cause instability in the gyro control loops with a consequent degradation in noise performance.

The in-plane vibration modes of the resonator 1 described are all well above the input vibration range. The planar nature of the resonator 1 results in the out-of-plane stiffness being significantly lower than the in-plane, however. The out-of-plane mode frequencies thus occur at lower frequencies with the lowest being the bending mode, as shown in FIG. 3, which occurs at approximately 2 kHz. This vibration mode may be excited directly by external vibration. The high Quality Factor of the ring 1 (approximately 2000) may result in a large amplitude of motion in this mode. In the limit, extremely high levels of applied vibration may result in mechanical failure of the resonator 1.

The sensor rate output for this gyroscope is within the specified operating limits for typical civil applications vibration specification. Under some of the more demanding military specifications, saturation of the pick-off output due to the large amplitude of motion in the out-of-plane bending mode causes the noise level to rise to unacceptably high levels.

There is thus a requirement for an improved gyroscope capable of operating in these harsh vibration environments.

A known means of imp roving the vibration tolerance of a gyroscopic device is to fix it onto an anti-vibration mount. This restricts the g-level to which it is exposed by absorbing some of the relative motion in the external mount. A problem with this solution is that the mount needs to be large enough to accommodate the entire mass of the gyroscope. This in creases the over all volume occupied by the sensor. For military applications, in particular, this is undesirable as the space envelope available for the sensor pack may be restricted. External anti-vibration mounts typically damp vibration inputs along every axis. For rapid angular applied rate not being applied instantaneously to the gyroscope and will consequently restrict its bandwidth. Any motion of the external mount will also cause a misalignment of the sensor axis which is again undesirable.

There is thus a need for a generally improved vibration damper assembly for a Vibrating Structure Gyroscope and for a vibrating structure gyroscope incorporating such a vibration damper assembly.

SUMMARY OF THE INVENTION

According to a first embodiment of the present invention there is provided a vibration damper assembly for a substantially ring-like, substantially planar resonator of a Vibrating Structure Gyroscope, including a female portion constructed so as to be attachable to a body of a Vibrating Structure Gyroscope to have limited resiliency with respect to the body in a direction substantially perpendicular to the body and a male portion fixedly attachable at or adjacent one end thereof to a resonator of the Vibrating Structure Gyroscope, projectable into the female portion, and fixedly attachable at or adjacent its other end in and to the female portion, with the assembly being such as to permit, in operation, damping of vibratory movement of the resonator in a direction substantially perpendicularly thereto whilst retaining stiffness and freedom to vibrate for the resonator in the plane thereof.

Preferably, the female portion includes an open ended axially bored tube-like metal collar locatable in an aperture through the body so that the longitudinal axis of the collar bore extends substantially perpendicularly to the body, a pair of superimposed, spaced apart, apertured metal rings or plate which are arrangeable with the aperture in one ring or plate adjoining or surrounding one open end of the collar and with the aperture in the other ring or plate adjoining and surrounding the other open end of the collar, and with the outermost peripheral edge of the two metal rings or plates being directly attachable to the body which extends therebetween, and a resilient apertured grommet engagable via its aperture around the collar and locatable between the pair of spaced rings or plates for engagement of the outer periphery of the grommet with the innermost peripheral edge of the resonator.

Conveniently, the pair of metal rings or plates are made of a beryllium-copper alloy and the resilient, apertured grommet is made of silicone rubber.

Advantageously, the female portion includes a pair of axially bored bushes each having a shoulder extending externally around one end thereof which bushes are locatable one at each end of the collar to project into the bore therein with the external shoulder on one of the said bushes engaging the adjoining ring or plate around the aperture therethrough and with the external shoulder on the other of said bushes engaging the adjoining other ring or plate around the aperture therethrough.

Preferably, the pair of bushes are made from an electrically insulating material which more preferably is a plastics material.

Conveniently, the male portion includes an open ended axially bored spindle having a first open ended region which is locatable in a bore through the resonator and which has a shoulder therearound for contact with the resonator around one open end of the bore therethrough, having a second open ended region which is engagable in a first of the bushes when the latter is located in the collar bore and having an intermediate flanged region having a diameter greater than the diameters of the first and second regions to bear at one surface against the resonator and at an opposite surface against the first bush shoulder.

Preferably, the male portion includes an open ended axially bored metal bush having a shoulder extending externally therearound at or adjacent one end, which metal bush is insertable in the second of said bushes, when the latter is located in the collar bore, so that the metal bush shoulder abuts the second bush shoulder, and a rod member having an enlarged head at one end, which rod member is projectable through the spindle bore, with the head engaging the spindle first region shoulder, through the collar bore and into fixable engagement at the other end of the rod member with the metal bush.

Conveniently, the rod member other end has an externally threaded region for flexible engagement with a correspondingly threaded internal region of the metal bush bore.

According to a further aspect of the present invention, there is provided a Vibrating Structure Gyroscope having a substantially ring-like, substantially planar resonator and a vibration damper assembly, according to any one of claims 1 to 10, attaching the resonator to an apertured substantially planar portion of a body of the gyroscope, wherein the resonator is made of metal, and the body has recessed portions surrounding the apertured therethrough for accommodating the metal rings or plates, which recessed portions taper towards the body aperture and terminate in a reduced thickness rim which defines said body aperture, with the body rim engaging the resilient grommet which assists in the damping effect.

Preferably, the components of the vibration damper assembly and the resonator and body are secured together by an adhesive which more preferably is a toughened epoxy adhesive.

BRIEF DESCRIPTION OF THE DRAWINGS

For a better understanding of the present invention, and to show how the same may be carried into effect, reference will now be made, by way of example, to the accompanying drawings is in which:

FIG. 6 is a vertical cross sectional view similar to that of FIG. 5 showing a resonator located via a male portion of the vibration damper assembly according to the present invention in the female portion thereof;

DETAILED DESCRIPTION

Figure 1A:
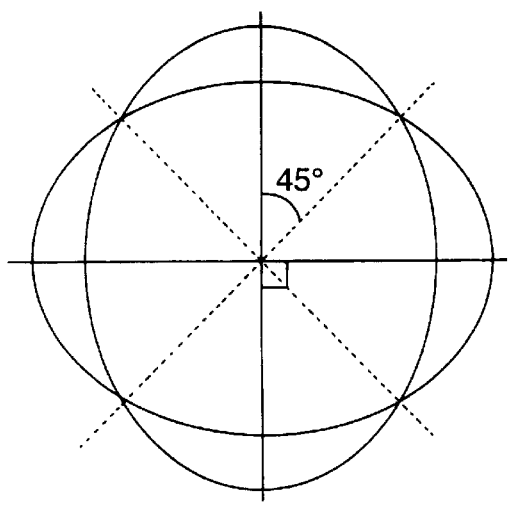
FIGS. 1A and 1B diagrammatically illustrate a carrier mode and response mode of vibration, respectively, for a conventional Vibrating Structure Gyroscope Ring Resonator excited into a $\cos 2\theta$ resonance mode.
Figure 1B:
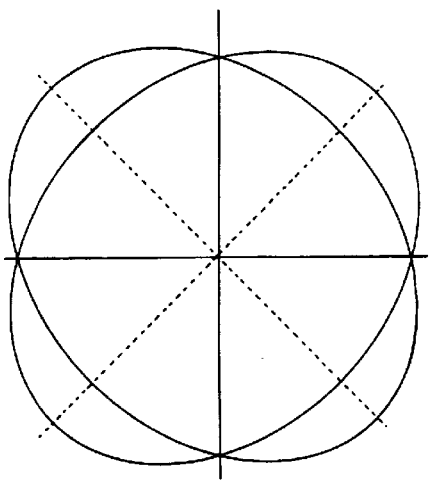
Figure 2:
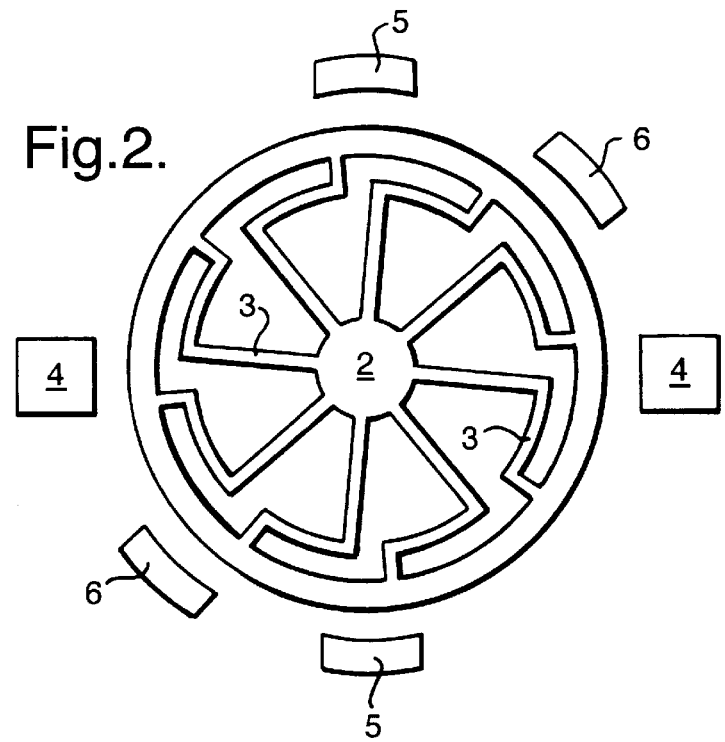
FIG. 2 is a diagrammatic planned view of a ring resonator, drive and pickoff means for a conventional Vibrating Structure Gyroscopes.
Figure 3:
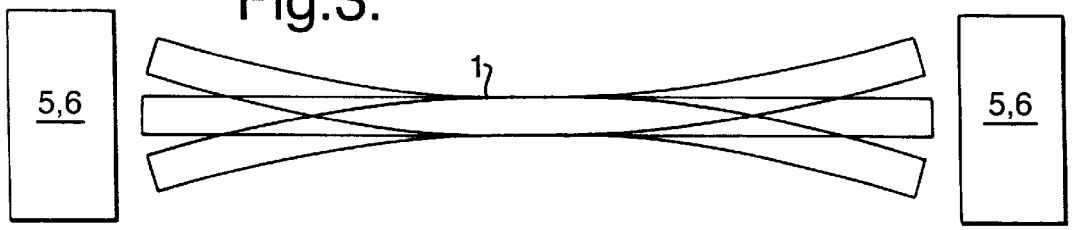
FIG. 3 diagrammatically illustrates in cross-section the vibration of the resonator of FIG. 2 along an axis normal to the plane of the resonator.
Figure 4A:
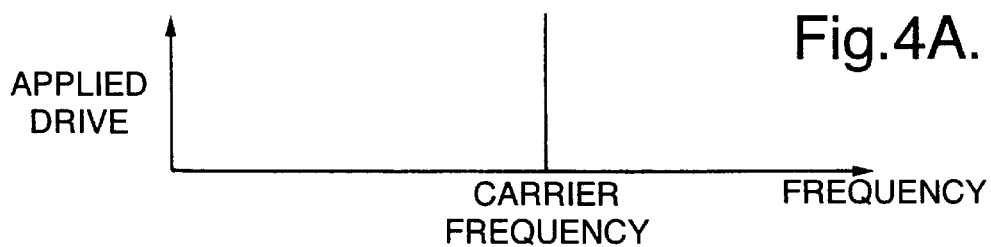
FIG. 4A graphically illustrates vibration of the resonator at the $\cos 2\theta$ resonance frequency with the carrier signal being shown on a plot of applied drive versus frequency.
Figure 4B:
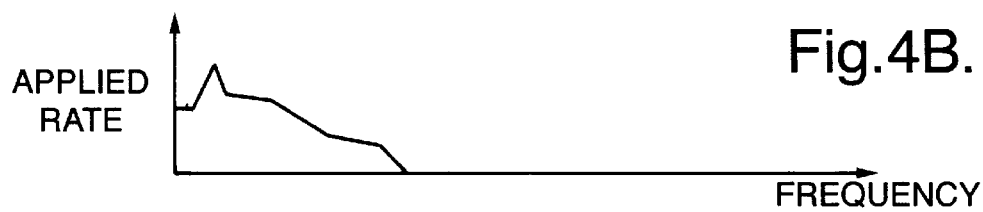
FIG. 4B shows graphically as a plot of applied rate against frequency the rate input.
Figure 4C:
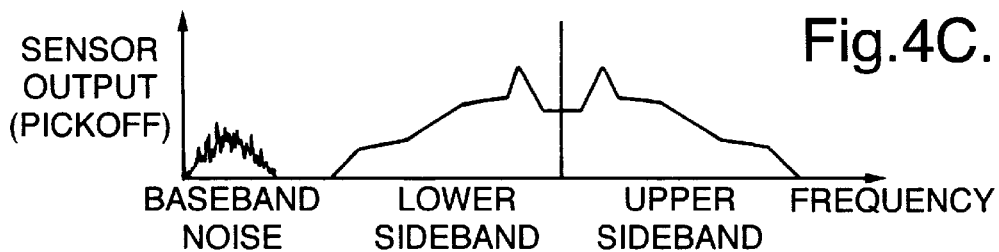
FIG. 4C shows as a plot of sensor pick off output against frequency how the rate input amplitude modulates the carrier giving side bands on the pick off signal output, with the vibration induced noise at the baseband frequency.
Figure 4D:
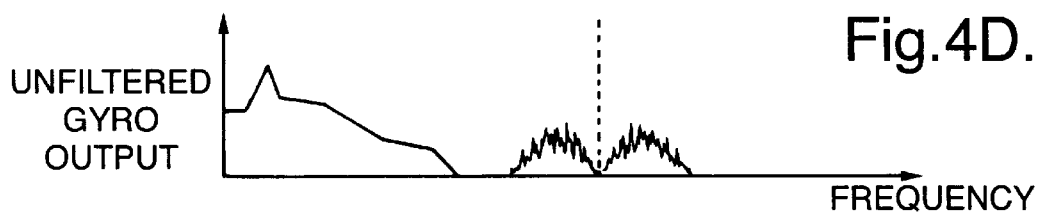
FIG. 4D shows as a graphic plot of unfiltered gyro output against frequency the output rate signal with the vibration induced noise in the absence of any filtering.
Figure 4E:
FIG. 4E shows as a graphic plot of effective baseband system response against frequency the effective system bandwidth in the present of filtering.
Figure 4F:
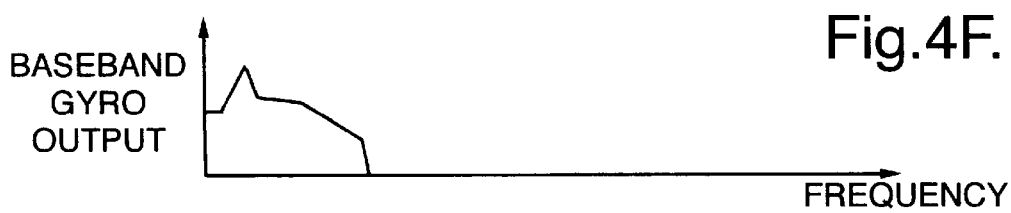
FIG. 4F shows as a graphic plot of baseband gyro output against frequency the observed rate output for the gyroscope of FIGS. 2 and 3.
Figure 5:
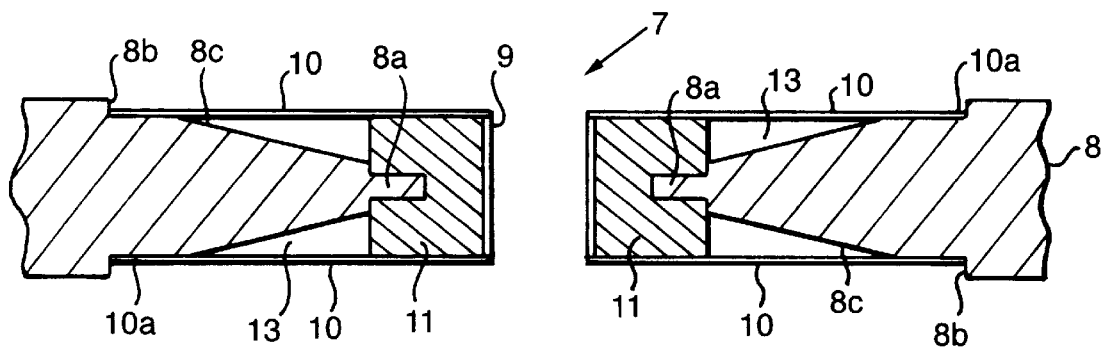
FIG. 5 is a vertical cross sectional view through part of a female portion of a vibration damper assembly according to the present invention in operative association with part of a body of a vibrating structure gyroscope.

A vibration damper assembly illustrated generally in FIGS. 5 and 6 of the accompanying drawings at 7 is intended for use with a substantially ring-like, substantially planar resonator 1 of a vibrating structure gyroscope. The vibration damper assembly 7 provides a means for damping the resonant response of the out of plane bending mode of the resonator 1 to prevent saturation of the pickoffs 5,6. This is achievable without increasing the overall vibrating structure gyroscope volume and with minimal or no introduction of misalignment or bandwidth problems. As shown in both FIGS. 5 and 6 the assembly 7 includes a female portion constructed so as to be attachable to a body 8 of a vibrating structure gyroscope to have limited resiliency with respect to the body 8 in a direction substantially perpendicular to the body 8. The assembly 7 also includes a male portion more particularly shown in FIG. 6 fixedly attachable at or adjacent one end thereof to the resonator 1 of the gyroscope projectable into the female portion, and fixedly attachable at or adjacent its other end in and to the female portion. The assembly 7 is such as to permit in operation damping of the vibratory movement of the resonator 1 in a direction substantially perpendicularly thereto whilst retaining stiffness and freedom to vibrate for the resonator 1 in the plane thereof.

The female portion includes an open ended axially bored tube-like metal collar 9 locatable in an aperture through the body 8 so that the longitudinal axis of the bore of the collar 9 extends substantially perpendicularly to the body 8. The female portion also includes a pair of superimposed, spaced apart apertured metal rings or plates 10 preferably made of beryllium-copper alloy. These rings or plates 10 are of relatively small size generally approximately 24 mm in diameter with a 0.12 mm thickness and a central aperture of 3.75 mm in diameter. The rings or plates 10 are arrangeable with the aperture in one ring or plate 10 adjoining and surrounding one open end of the collar 9 and with the aperture or plate 10 adjoining in the other ring or plate 10 adjoining and surrounding the other open end of the collar 9 as shown in FIGS. 5 and 6. The other most peripheral edge 10a of the two rings or plates 10 are directly attachable to the body 8 which extends therebetween. The female portion further includes a resilient apertured grommet 11, preferably made of silicon rubber, for damping, engagable via its aperture around the collar 9 and locatable between the rings or plates 10 for engagement at the outer periphery of the grommet 11 with the innermost peripheral edge or rim 8a of the body 8.

Further forming part of the female portion of the assembly 7 is a pair of axially bored bushes 12 each having a shoulder 12a extending externally around one end thereof. The bushes 12 are locatable one at each end of the collar 9 to project into the bore therein with the external shoulder 12a on one bush 12 engaging the adjoining ring or plate 10 around the aperture therethrough and with the external shoulder 12a on the other bush 12 engaging the adjoining other ring or plate 10 around the aperture therethrough. Preferably the bushes 12 are made from an electrically insulating material such as a plastics material. The collar 9 is rigid whereas the grommet 11 is resilient. The grommet 11 in a typical example of the invention is of 12 mm diameter and 5 mm thick. A recess typically 1 mm in width and 2 mm deep is located midway around the grommet 11 into which recess the rim or outer edge 8a of the body is fixed. The body 8 has recessed portions 8b surrounding the aperture therethrough for accommodating the metal rings or plates 10 as shown particularly in FIG. 5. The recessed portions 8b of the body 8 taper towards the body aperture and terminate in the reduced thickness rim 8a which defines the body aperture. The tapered regions 8c of the body 8 define with the rings or plates 10 and the grommet 11 pockets 13 which may contain air or other medium to assist in the damping effect of the grommet 11.

The male portion of the assembly 7 includes an open ended axially bored spindle 14 having a first open ended region 15 which is locatable in a bore through the resonator 1 and which has a shoulder 15a therearound for contact with the resonator 1 around one open end of the bore therethrough. The spindle 14 has a second open ended region 14a which is engagable in a first of the bushes 12 as shown in FIG. 6. Also forming part of the spindle 14 is an intermediate flanged region 16 having a diameter greater than the diameter of the first and second regions 15 and 14a to bear at one surface against the resonator 1 and at an opposite surface against the first bush shoulder 12a.

The bushes 12 which are electrically insulating serve electrically to isolate the resonator 1 and the male portion of the assembly, which are at a high voltage, from the gyroscope body 8.

Also forming part of the male portion is an open ended axially bore metal bush 17 having a shoulder 17a extending externally therearound at or adjacent one end. The bush 17 is insertable in the second of the bushes 12 which is in the collar bore so that the shoulder 17a abuts the second bush shoulder 12a and a rod member 18 having an enlarged head 18a at one end is projectable through the spindle bore with the head 18a engaging the spindle first region shoulder 15a, through the collar bore and into fixable engagement of the other end of the rod member with the metal bush 17. Preferably as illustrated in FIG. 6 the rod member other end has an externally threaded region 18b for releasably fixable engagement with a correspondingly threaded internal region of the metal bush bore.

The components of the vibration damper assembly of the present invention and the resonator and body of the Vibrating Structure Gyroscope preferably are fixed together using an adhesive which conveniently is a toughed epoxy adhesive such as Araldite AV119 (Trade Mark). The adhesive provides adequate bonding and peel strength with a glass transition temperature above 90° C. so that its mechanical properties remain substantially constant over the operating temperature range of the gyroscope.

The assembly 7 is stiff both torsionally and in the plane of the resonator 1 and thus will not introduce any additional in-plane motion in response to external vibration. The rate response and in-plane vibration response will thus be substantially unaffected. The assembly is, however, compliant in the axis normal to the resonator plane. Under the influence of vibration in the axis normal to the plane of the resonator 1 the resonator/damper assembly will move relative to the gyro body 8.

However, where the Silicone rubber grommet 11 is recessed around its mid-point between the plates 10 it is fixed to the gyro body 8., As the assembly moves upwards the Silicone rubber below the section is compressed with the rubber above being put into the tension and vice versa as the assembly moves downwards. This straining of the Silicone rubber grommet serves to dissipate the vibration energy thus suppressing the mechanical quality factor of the damper resonance.

Figure 7A:
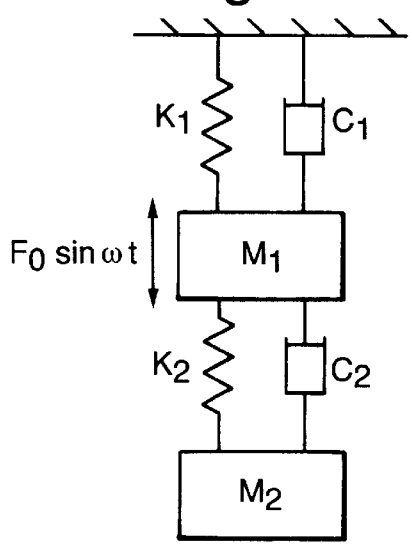
FIG. 7A shows schematically how the relative motion of the gyro body pickoffs, vibration damper assembly and resonator according to the present invention may be modelled without internal damping.
Figure 7B:
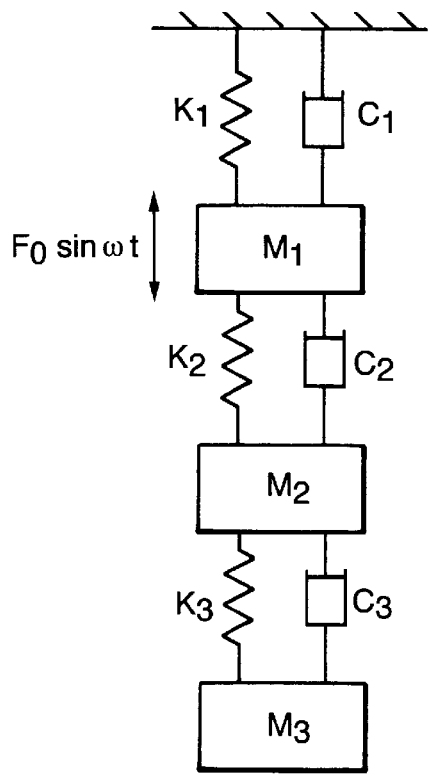
FIG. 7B shows how the same as in FIG. 7A may respond with the presence of the internal vibration damper assembly according to the present invention.

The damper assembly 7 is designed such that it has an out-of-plane resonance frequency of around 1 kHz with a Quality Factor of approximately 60. The ring resonance frequency is around 2 KHz with a Quality Factor of approximately 2000 The relative motion of the gyro body/pick-offs, damper assembly and resonator 1 may be modelled by considering the respective components to be a series of coupled, damped spring-masses undergoing forced vibration. The response of this system may be compared with that of a system without a damper assembly of the invention. The system without a damper assembly is shown in FIG. 7A, $M_1$ is the gyro body mass with $K_1$ and $C_1$ being the spring constant and damping coefficient, respectively, connecting the gyro to the external vibration source (e.g., vibration table). $M_2$ is the effective resonator mass with $K_2$ ad $C_2$ the spring constant and damping coefficient for the out-of-plane mode. The vibration is applied to the gyro body 8 and expressions may be derived for the relative motion of the masses as a function of input vibration frequency. The corresponding case including a damper assembly according to the invention is shown in FIG. 7B. For this system, $M_1$, $K_1$ and $C_1$ are as in FIG. 7A but $M_2$ now represents the combined damper and spindle and resonator support mass. $K_2$ and $C_2$ refer to the coupling between the gyro body and damper assembly. $M_3$ is the effective resonator mass with $K_3$ and $C_3$ representing the resonator to damper assembly coupling.

Figure 8:
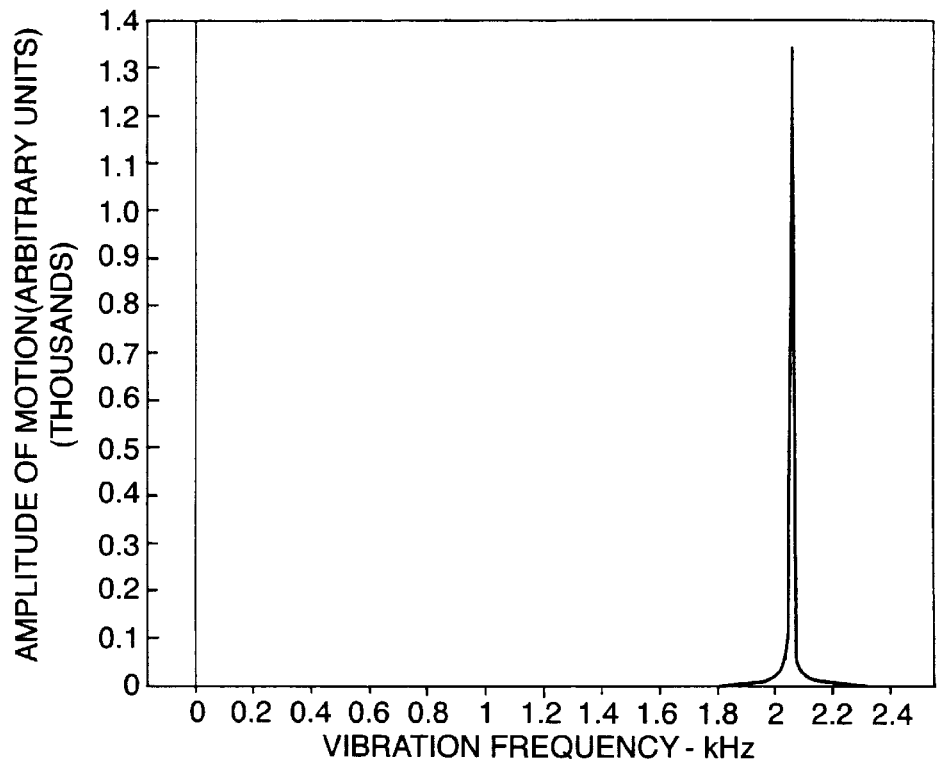
FIG. 8 is a graphical display of amplitude of motion against vibration frequency showing the motion of the resonator with respect to the pick offs and gyro body for a vibrating structure gyroscope without a vibration damper assembly according to the present invention.
Figure 9:
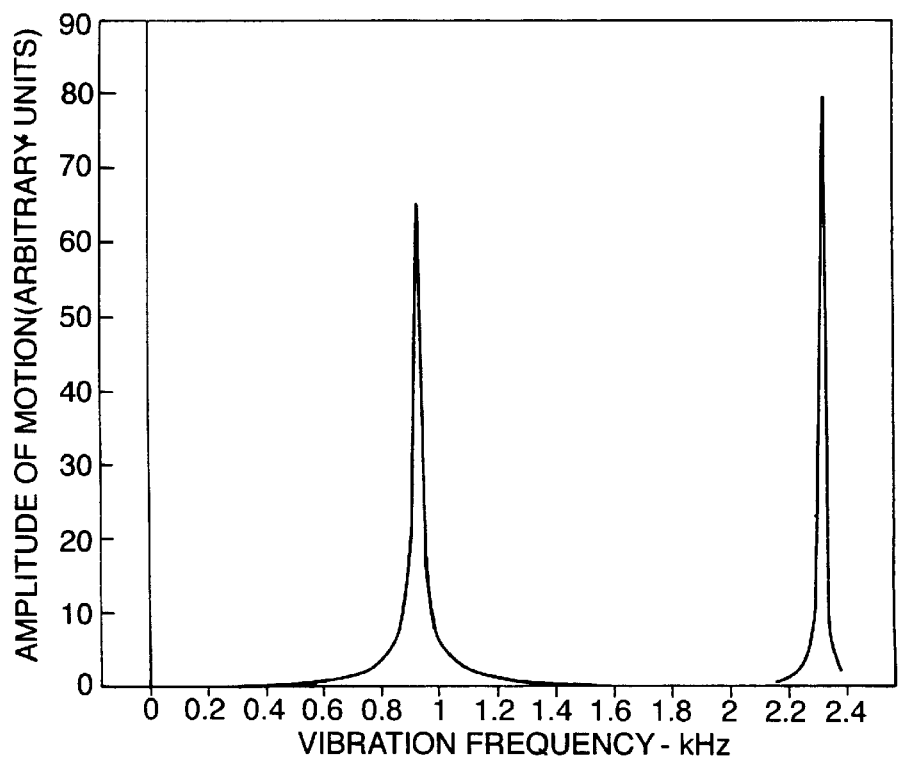
FIG. 9 is a graphic display of amplitude of motion against vibration frequency showing the motion of the resonator with respect to the pickoffs and gyro body in the presence of a vibration damper assembly according to the present invention.

The motion of the resonator 1 with respect to the pick-offs 5, 6 and body 8, with no damper assembly, is plotted in FIG. 8. The plot shows the relative motion on the y-axis (arbitrary units) as a function of applied vibration frequency, for a constant input vibration level. The amplitude of motion increases sharply at the out-of-plane bending frequency of the ring 1. It is this motion which saturates the pick-off output and leads to a dramatic increase in noise level. FIG. 9 shows the effect of introducing a damper assembly. A second resonance feature appears associated with the damper assembly resonance. The coupling between the ring 1 and damper assembly oscillations results in both resonant frequencies being perturbed from their independent natural frequencies. The damper assembly resonance appears approximately 100 Hz below its unperturbed natural frequency with the ring resonance appearing some 200 Hz above its natural frequency. The peak amplitude of the ring resonance is drastically reduced, by over an order of magnitude, by the presence of the damper assembly. This reduction is sufficient to prevent saturation of the pick-off output at high vibration levels thus enabling the gyro to meet the high vibration input performance specification.

By mounting the resonator 1 on a damper assembly 7 which is internal of the gyro, vibration sensitivity may be drastically reduced. The assembly 7 replaces the usual solid metal body 8 of the gyro on which the resonator is normally mounted and thus does not increase the gyro size.

Any relative motion of the resonator 1 with respect to the pick offs 5 at baseband frequencies (noise) due to the inclusion of the relatively low frequency resilient mounting does not contaminate the required rate signals due to the processes described in respect of FIG. 4.

What is claimed is:

1. A vibration damper assembly for a substantially ring like, substantially planar resonator of a Vibrating Structure Gyroscope, including a female portion constructed so as to be attachable to a body of a Vibrating Structure Gyroscope to have limited resiliency with respect to the body in a direction substantially perpendicular to the body, and a male portion fixedly attachable at or adjacent one end thereof to a resonator of the vibrating structure gyroscope, projectable into the female portion, and fixably attachable at or adjacent its other end in and to the female portion, with the assembly being such as to permit, in operation, damping of vibratory movement of the resonator in a direction substantially perpendicularly thereto whilst retaining stiffness and freedom to vibrate for the resonator in the plane thereof.

2. An assembly according to claim 1 wherein the female portion includes an open ended axially bored tube-like metal collar locatable in an aperture through the body so that the longitudinal axis of the collar bore extends substantially perpendicularly to the body, a pair of superimposed, spaced apart aperture metal rings or plates which are arrangeable with the aperture in one ring or plate adjoining and surrounding one open end of the collar and with the aperture in the other ring or plate adjoining and surrounding the other open end of the collar, and with the outermost peripheral edge of the two metal rings or plates being directly attachable to the body which extends therebetween, and a resilient apertured grommet engagable via its aperture around the collar and locatable between the pair of spaced rings or plate for engagement of the outer periphery of the grommet with the innermost peripheral edge of the body.

3. An assembly according to claim 2, wherein the pair of metal rings or plates are made of a berlyium-copper alloy and wherein the resilient, apertured grommet is made of silicone rubber.

4. An assembly according to claim 2, wherein the female portion includes a pair of axially bored bushes each having a shoulder extending externally around one end thereof, which bushes are locatable one at each end of the collar to project into the bore therein with the external shoulder on one of said bushes engaging the adjoining ring or plate around the aperture therethrough and with the external shoulder on the other of said bushes engaging the adjoining other ring or plate around the aperture therethrough.

5. An assembly according to claim 4, wherein the pair of bushes are made from an electrically insulating material.

6. An assembly according to claim 5, wherein the pair of bushes are made from a plastics material.

7. An assembly according to claim 1, wherein the male portion includes an open ended axially bored spindle having a first open ended region which is locatable in a bore through the resonator and which has a shoulder therearound for contact with the resonator around one open end of the bore therethrough, having a second open ended region which is engagable in the first of the bushes when the latter is located in the collar bore and having an intermediate flanged region having a diameter greater than the diameters of the first and second regions to bear at one surface against the resonator and at an opposite surface against the first bush shoulder.

8. An assembly according to claim 7, wherein the male portion includes an open ended axially bored metal bush having a shoulder extending externally therearound at or adjacent one end, which metal bush is insertable in the second of said bushes, when the latter is located in the collar bore, so that the metal bush shoulder abuts the second bush shoulder, and a rod member having an enlarged head at one end which rod member is projectable through the spindle bore, with a head engaging the spindle first region should, through the collar bore and into fixable engagement at the other end of the rod member with the metal bush.

9. An assembly according to claim 8, wherein the rod member other end has an externally threaded region for fixable engagement with a correspondingly threaded internal region of the metal bush bore.

10. A Vibrating Structure Gyroscope having a substantially ring-like, substantially planar resonator and a vibration damper assembly according to claim 1, attaching the resonator to an apertured substantially planar portion of a body of the gyroscope, wherein the resonator is made of metal, and the body has recessed portions surrounding the aperture therethrough for accommodating the metal rings or plates, which recessed portions taper towards the body aperture and terminate in a reduced thickness rim which defines said body aperture, with the body rim engaging the resilient grommet which assists in the damping effect.

11. A Vibrating Structure Gyroscope according to claim 10, wherein the components of the vibration damper assembly and of the resonator and body are secured together with an adhesive.

12. A vibrating structure gyroscope according to claim 11, wherein the adhesive is a toughened expoxy adhesive.

13. An assembly according to claim 3, wherein the female portion includes a pair of axially bored brushes each having a shoulder extending externally around one end thereof, which brushes are locatable one at each end of the collar to project into the bore therein with the external shoulder on one of said bushes engaging the adjoining ring or plate around the aperture therethrough and with the external shoulder on the other of said bushes engaging the adjoining other ring or plate around the aperture therethrough.

14. An assembly according to claim 2, wherein the male portion includes an open ended axially bored spindle having a first open ended region which is locatable in a bore through the resonator and which has a shoulder therearound for contact with the resonator around one open end of the bore therethrough, having a second open ended region which is engageable in the first of the bushes when the latter is located in the collar bore and having an intermediate flanged region having a diameter greater than the diameters of the first and second regions to bear at one surface against the resonator and at an opposite surface against the first bush shoulder.

15. An assembly according to claim 3, wherein the male portion includes an open ended axially bored spindle having a first open ended region which is locatable in a bore through the resonator and which has a shoulder therearound for contact with the resonator around one open end of the bore therethrough, having a second open ended region which is engageable in the first of the bushes when the latter is located in the collar bore and having an intermediate flanged region having a diameter greater than the diameters of the first and second regions to bear at one surface against the resonator and at an opposite surface against the first bush shoulder.

16. An assembly according to claim 4, wherein the male portion includes an open ended axially bored spindle having a first open ended region which is locatable in a bore through the resonator and which has a shoulder therearound for contact with the resonator around one open end of a bore therethrough, having a second open ended region which is engageable in the first of the bushes when the latter is located in the collar bore and having an intermediate flanged region having a diameter greater than the diameters of the first and second regions to bear at one surface against the resonator and at an opposite surface against the first bush shoulder.

17. An assembly according to claim 5, wherein the male portion includes an open ended axially bored spindle having a first open ended region which is locatable in a bore through the resonator and which has a shoulder therearound for contact with the resonator around one open end of the bore therethrough, having a second open ended region which is engageable in the first of the bushes when the latter is located in the collar bore and having an intermediate flanged region having a diameter greater than the diameters of the first and second regions to bear at one surface against the resonator and at an opposite surface against the first bush shoulder.

18. An assembly according to claim 6, wherein the male portion includes an open ended axially bored spindle having a first open ended region which is locatable in a bore through the resonator and which has a shoulder therearound for contact with the resonator around one open end of the bore therethrough, having a second open ended region which is engageable in the first of the bushes when the latter is located in the collar bore and having an intermediate flanged region having a diameter greater than the diameters of the first and second regions to bear at one surface against the resonator and at an opposite surface against the first bush shoulder.

* * * * *

UNITED STATES PATENT AND TRADEMARK OFFICE
CERTIFICATE OF CORRECTION

PATENT NO. : 6,191,521
DATED : February 20, 2000
INVENTOR(S) : Christopher Paul Fell et al.

It is certified that error appears in the above-identified patent and that said Letters Patent is hereby corrected as shown below:

<u>Column 2,</u>
Line 61, change "imp roving" to -- improving --.

<u>Column 3,</u>
Line 4, after "angular" insert -- accelerations the compliance of the mount will result in the --.

Signed and Sealed this

Thirteenth Day of November, 2001

Attest:

NICHOLAS P. GODICI
Attesting Officer    Acting Director of the United States Patent and Trademark Office